F. W. VODOZ.
POWER TRANSMISSION GEARING.
APPLICATION FILED JUNE 28, 1912.
1,091,606.
Patented Mar. 31, 1914.
3 SHEETS—SHEET 3.
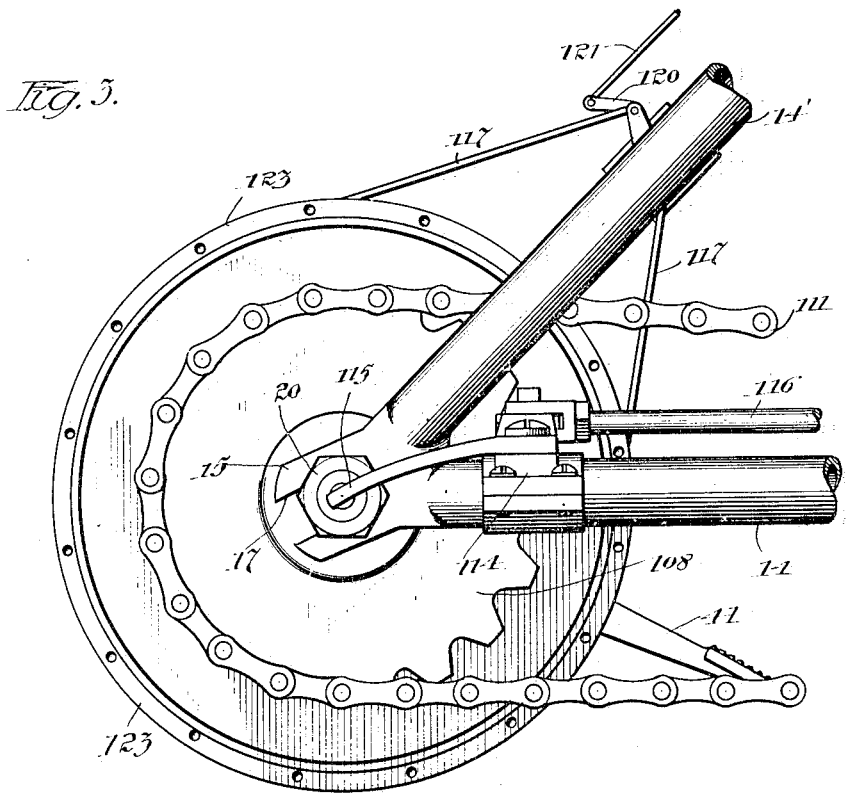
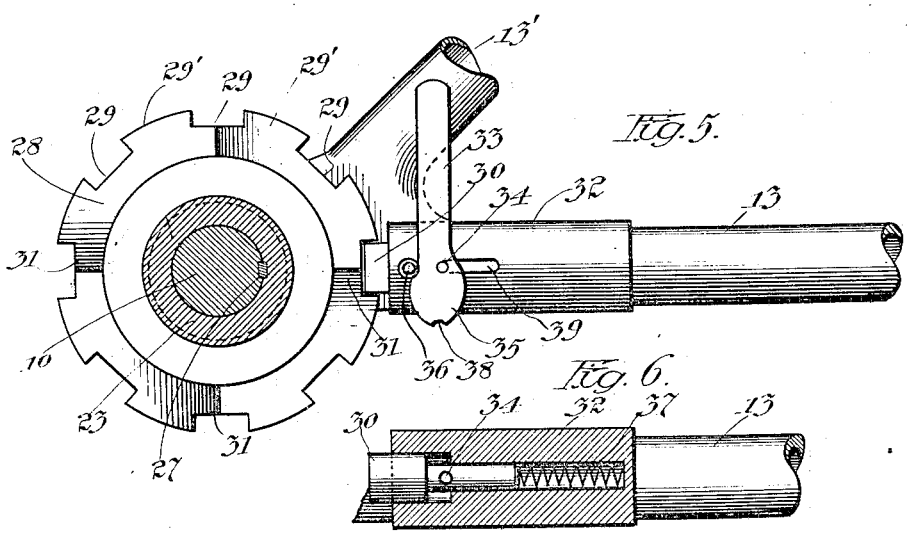
Witnesses:
Robt F Weir
Arthur Carlson
Inventor:
Frederick W. Vodoz.
by Jorée Bain & Mays
Attys.

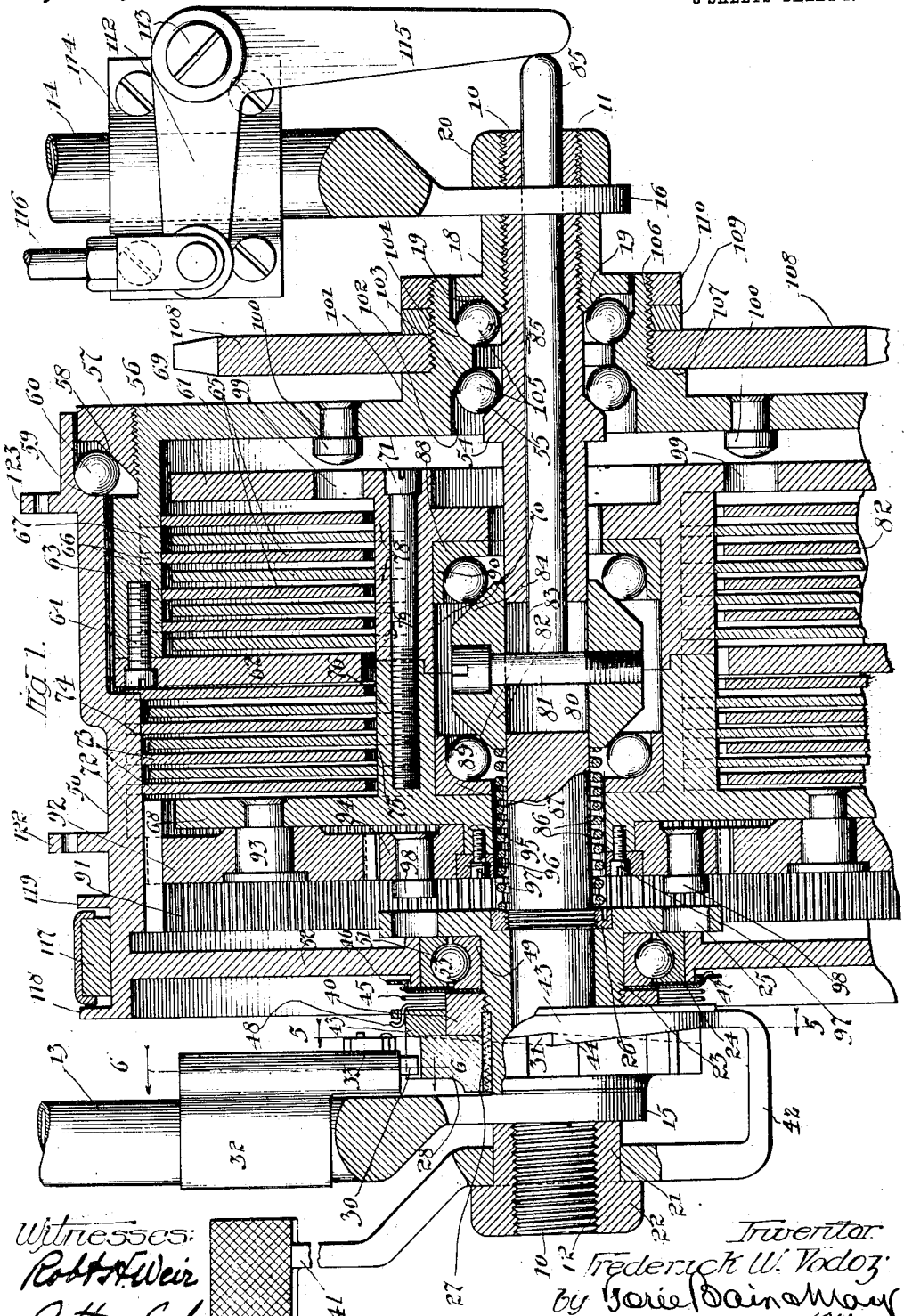
F. W. VODOZ.
POWER TRANSMISSION GEARING.
APPLICATION FILED JUNE 28, 1912.
1,091,606.
Patented Mar. 31, 1914.
3 SHEETS—SHEET 1.

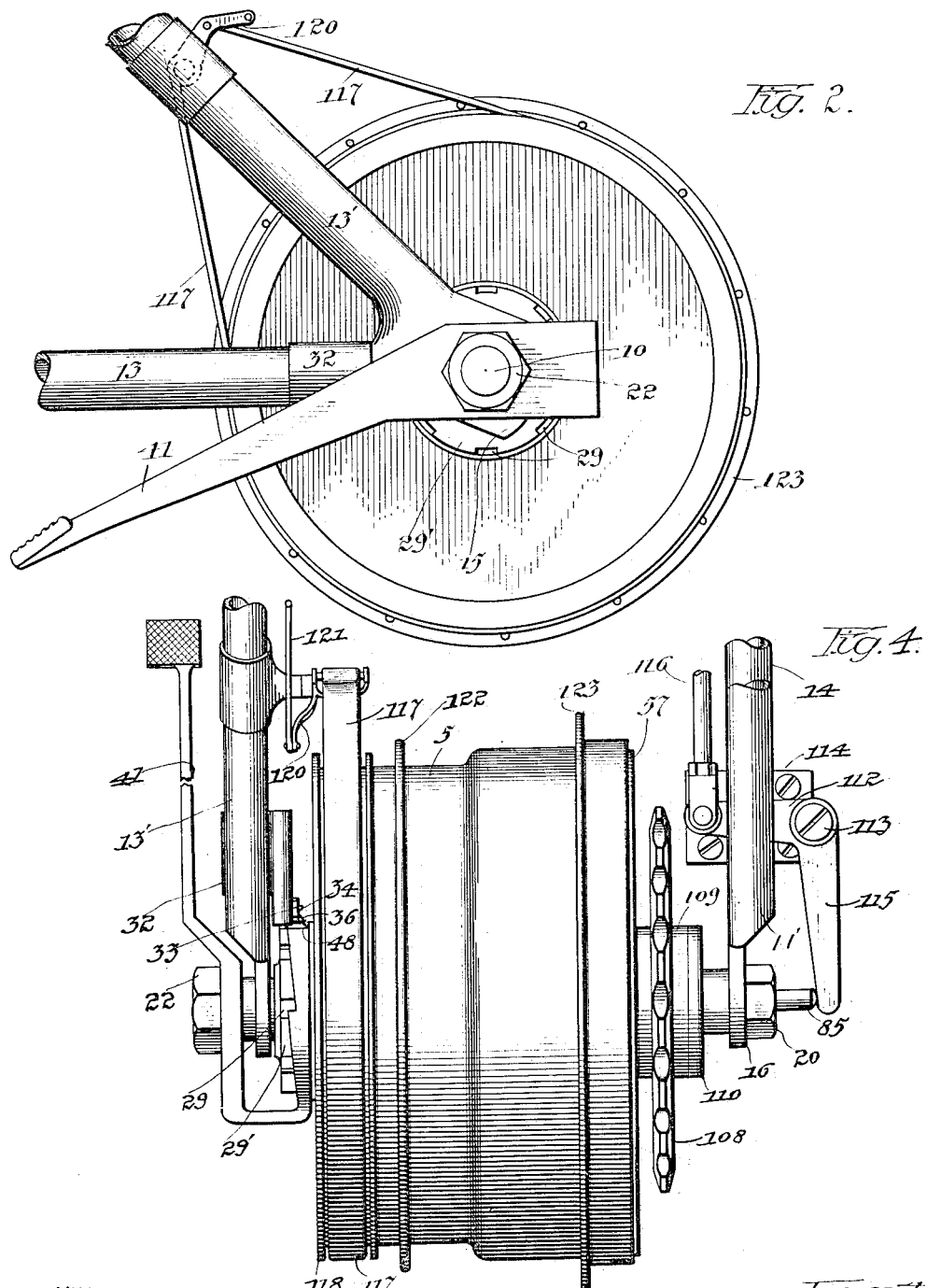

UNITED STATES PATENT OFFICE.

FREDERICK W. VODOZ, OF CHICAGO, ILLINOIS.

POWER-TRANSMISSION GEARING.

1,091,606.
Specification of Letters Patent.
Patented Mar. 31, 1914.

Application filed June 28, 1912. Serial No. 706,316.

*To all whom it may concern:*

Be it known that I, FREDERICK W. VODOZ, a citizen of the United States, residing at Chicago, in the county of Cook and State of Illinois, have invented certain new and useful Improvements in Power-Transmission Gearing, of which the following is a specification.

My invention relates to power transmission gearing.

One of the objects of my invention is to provide a power transmission gearing especially adapted for motorcycles.

Another object of my invention is to provide means therein whereby the engine may be initially started, by application of pressure to a "kick-lever" provided for the purpose and operable by proper manipulation of the gearing.

Still another object of my invention is to provide a gearing having two rates of speed, and friction operable means for gradual acceleration when the gear is shifted to change the speed.

Other and further objects of my invention will become readily apparent to persons skilled in the art from a consideration of the following description when taken in conjunction with the drawings, wherein:—

Figure 1 is a longitudinal, central section, of the device, as it is applied to a motorcycle; Fig. 2 is a reduced elevation, looking at it from one side; Fig. 3 is a similar view looking at it from the opposite side; Fig. 4 is an end elevation; Fig. 5 is a section, taken on line 5—5 of Fig. 1; and Fig. 6 is a section, taken on line 6—6 of Fig. 1, showing the kick lever latch.

In all the views the same reference characters refer always to corresponding parts.

A partially hollow, fixed axle 10 is threaded at each end, as at 11 and 12. Frame members 13 and 14, of the motorcycle, are flattened, at their respective ends 15 and 16, and each member is forked as at 17, for engagement with said axle. A sleeve 18 is threaded for coöperation with the screw threaded end, as at 11 of the axle 10. It is provided with a tapering or conical hardened bearing surface 19 to afford ball-bearing engagement. The flattened end 16, of the frame member 14, is placed over the screw threaded end of the axle 10 in contact with the sleeve 18, and the nut 20 is screw threaded over the end of the axle, to hold the frame member 14 in firm engagement therewith. At the other end of the axle the side frame 13, having the flattened end 15, is secured to the axle by means of a nut 21 having an enlarged head 22.

A sleeve 23, is loosely mounted on the stationary axle 10, and is provided with a flange 24, perforated at intervals, as at 25. Its longitudinal movement, on the axle, is limited by the screw collar 26, secured to the shaft and the flat portion, 15, of the frame 13, but it may be rotated freely when released from fixed connection with the frame of the motorcycle. Mounted on the sleeve 23, and secured thereto by means of key or feather 27 is a disk 28, more clearly shown in Fig. 5. The disk is provided with a series of notches 29 uniformly distributed around its periphery to provide teeth 29' between which a latch bolt 30 is adapted to engage for preventing rotation of the sleeve 23. The disk 28 is provided with ratchet teeth 31 in its side surfaces, of which there are four, the object of which will be hereafter explained.

The latch bolt 30 has yielding longitudinal movement in the housing 32, which housing is rigidly secured to the side member 13, of the motorcycle frame. The bolt 30 is yieldingly movable in the housing 32, being outwardly pressed by means of a spring 37. A lever 33 is pivotally secured to the bolt 30, by means of a pin 34, so that when the lever 33 is down turned at substantially right angles to the position shown in Fig. 5, the enlarged end 35, is pressed into contact with the pin 36, until the notch 38, of the lever 33, engages the pin, whereby it is held in the position into which it has been placed. The pin 34 is moved in slot 39, of the housing 32, and the bolt 30 is thereby withdrawn from the space 29, between the teeth 29' of the disk 28, leaving the disk 28 and the sleeve 23 to which it is fixed free to turn on the axle 10. A collar 40 is also secured to the sleeve 23, by means of the screw threaded engagement and the key 27.

A kick lever 41, for starting the engine has rotatable and laterally slidable bearing on the reduced portion of the nut 21, and it is inturned, as at 42, and provided with an enlarged perforate disk end 43, adapted for rotatable movement on the collar 40. It is also provided, on its side confronting the disk 28, with ratchet teeth 44, that coact with the ratchet teeth 31 on the disk 28, so that when pressure is applied to the outer end 41 of the kick lever, said lever will turn the sleeve 23, in the same direction of motion that the lever is being moved, by means of engagement of the ratchet teeth 31 and 44 provided respectively on the disk 28, secured to the sleeve 23, and on the enlarged end 43 of the kick lever.

An open helical spring 45 surrounds the collar 40, and tends to press the lever portion 43 outwardly and holds it normally in engagement with the teeth 31 of the disk 28. A thin disk 46 is secured to the collar 40 and supports one end, 47, of the spring 45. The other end 48 of the spring 45, is connected to the part 43, of the kick lever, so as normally to maintain the kick lever in a raised position. This spring possesses the double function of yieldingly maintaining the teeth 44 and 31 in contact and at the same time of raising the extended end of the kick lever 41, after it has been depressed. When the end 41 of the kick lever is displaced downwardly, by means of pressure applied to the foot piece thereof, the spring 45 serves to return it to its normal position and at the same time it is laterally compressible and permits of longitudinal movement of the lever 41 on its outer support, the nut 21, and on the inner support, the collar 40, so that the teeth 31 and 44, on the respective coacting parts, may pass each other when the said parts are caused to rotate in opposite directions.

Secured to the sleeve 23 is a ball bearing ring 49, and a corresponding ring 51, is secured in the flange 52, of the housing 50, and balls 53, are contained between the said rings. This affords one frictionless support for the outer shell member 50. The fixed axle 10 is enlarged, as at 54, to provide a tapering hardened, ball bearing surface 55, for an inner member or shell 56. A bearing ring 57 is screw threaded on the end of the shell 56 and is provided with a tapered bearing surface 58 for a coacting bearing surface 59, of the outer shell or member, between which balls 60 are included to provide substantially frictionless engagement between these members. The shell 56 is provided with exterior and interior flanges 61 and 62, the latter being secured to the outer rim 63, of the inner shell 56, by means of screws 64. A series of centrally perforated friction disks, or rings 65 are adapted for longitudinal movement in the said inner shell, in a key way 67 and each of the disks, 65 is provided with a key extension 66 that is adapted to be moved longitudinally in the key way 67 and by this means they are prevented from rotation independently of the shell 56, but are capable of free longitudinal movement therein. An intermediate, longitudinally movable member is provided by the flanges 68, 69, and the drum portion 70, being held together by screws 71. The other member 50 is provided with a key way 72 within which keys 74 of the disks 73 prevent rotary movement, independent of the shell member 50, but permit longitudinal movement therein. Alternating with the disks 73 are a series of similar disks 75, that are each provided with keys 76, that are slidable on the drum portion 70, of the intermediate member and another series of disks 77 are in alternate relation with the disk 65 of the inner shell and these are prevented from having rotary motion, independent of the drum portion 70 by means of the keys 78 that are slidable in a key way 79, provided in the drum 70 of said intermediate member.

The axle 10 is slotted, as at 80, for accommodation of the screw 81. The screw 81, passes diametrically through a bi-conical sleeve 82, having tapered ball bearing surfaces 83 and 84 respectively on each side, and adapted to be freely slid within limits of the slot 80, by means of a rod 85 which passes through the bore of the axle 10, and by its impingement against the screw 81, the sleeve 82 may be moved to the left against the resilient, open helical spring, 86. Rings 87 and 88, are secured in the intermediate member for ball bearing surfaces for coöperation with the tapered conical surfaces 83 and 84, respectively, between which are contained the balls 89 and 90 respectively, thus affording rotary support for the intermediate member.

The outer shell 50 is provided with internal gear teeth 91, of such width as to permit considerable latitude of movement of the intermediate pinion 92, which meshes with the said teeth, and which is rotatably secured to the flange 68 of the intermediate member, by means of the stud 93. The stud 93 is firmly secured in the flange 68 and the pinion 92 is freely revoluble on the stud 93. A gear wheel 94, meshes with the intermediate gear 92 and is rotatable on a projection 95 from the flange 68 of the intermediate member. It is held in place by means of the ring 96 secured to the part 95 by the means of a series of screws 97, so that the gear wheel 94 cannot be laterally displaced, but is free for rotary movement on its bearings. Projecting from the side of the gear wheel 94, are studs 98 adapted for engagement with perforations 25, made in the flange 24 that radially projects from the sleeve 23. When the intermediate member, carrying the wheel 94 is moved laterally to the left, the engagement of the stud 98 with the perforations 25 may be effected. Similar perforations 99 are in the flange 69, for engagement of the stud 100, that projects inwardly from the flange 61, when said intermediate member is moved longitudinally to the right, or in the opposite direction to that heretofore mentioned.

Projecting laterally from the flange 61, of the inner shell 56 is a hub 101, perforated, as at 102, and provided with tapered hardened bearings 103 and 104, for the balls 105 for coöperation with the hardened surfaces 19 and 55 respectively, of the shaft 10, thus affording bearing for the hub of the inner shell 56. The hub is screw threaded as at 106, and is provided with a shoulder 107. An interiorly threaded sprocket wheel, 108, is screwed on to the exteriorly threaded end of the hub and is secured and held in place by means of the nut 109, and the check nut 110. This sprocket wheel is connected to the driving engine, of the motorcycle (not shown), by means of the chain 111, in the usual manner.

A bell crank 112 is pivoted to the screw 113 which is attached to a bracket 114, secured on the frame member 14, and is provided with an extended arm 115, that abuts against the end of the slidable rod 85. A rod 116 is connected to the other end of the bell crank and extends to a point near the operator's seat, for manipulation of the bell crank for the purpose to be hereinafter described. A brake band 117, of the usual form, surrounds the outer shell 50, and is contained between flanges 118 and 119.

120 is means for tightening the brake, operable by rod 121 which extends to a position near the seat of the operator.

Perforate flanges 122 and 123, extending radially from shell 50, afford means for securing the spokes of the wheel thereto.

As well understood, a gasolene engine, by which motorcycles are usually propelled, requires initial rotation of its shaft before it becomes self propelling.

The operation of the device will be well understood. The kick lever 41 is employed for the purpose of starting the engine, through the gearing, disclosed in this application, as follows:—The application of pressure to the pedal lever, 41, causes the enlarged ratchet portion 43 thereof, to engage the teeth 31 of the disk 28 and thereby the sleeve 23, carrying the perforated flange 24 is rotated. Before the kick lever is operated, however, in the process of starting the engine, the brake 117 is applied, so as to hold the outside shell member 50 and the wheel of the motorcycle in immovable position and the latch bolt 30 is withdrawn to permit rotation of the sleeve 23. Then the bell crank is moved so as to apply pressure on the end of the rod 85 which impinges upon the screw 81 and thereby the bi-conical sleeve 82, will be moved to the left, against the tension of the spring 86, thus laterally shifting the intermediate member, composed of the flanges 68, 69, and the drum 70, laterally, within the two outer shell members 50 and 56, until the stud 98 makes engagement with the perforation 25, within the disk or flange 24. This intermediate shiftable member is moved by the application of pressure to the balls 89, which have bearing relation with the bi-conical sleeve 82. At the time when the studs 98 enter the perforations 25 the friction disks 65 and 66 are brought into frictional contact with each other, thereby frictionally connecting the intermediate member with the inner shell 56 and through the agency of the gear train, composed of the axially rotatable gear 94, and the intermediate pinions 92. When the gear train is rotated in the manner described, the intermediate member 69, is rotated in the same direction in which the pedal lever 41 is moving, and therefore, the sprocket wheel 108, which is directly connected with the engine is rotated in the same direction in which the engine will be rotated when it becomes self propelling. After pressure has been released from the pedal 41, the spring 45 will raise the pedal to its normal elevated position, and will also permit its lateral movement, on the shaft 10, so that the teeth 31 and 44 will again engage, for the purpose of another impulse, to be effected by application of pressure to the pedal 41. This operation may be repeated until the engine has been sufficiently rotated to become self propelling. Now, after the engine becomes self propelling, the effect will be to rotate the sleeve 23, and after the engine has gotten well under way the latch arm 33 is again moved into the position shown in Fig. 5, so that the bolt 30 engages one of the notches 29, of the disk 28, and in this way the sleeve 23 is rigidly fixed to the frame of the vehicle, and the gear wheel 94, can no longer be turned on its axis, and therefore, the outer member 50, or the traction wheel of the vehicle, will be rotated, but at a relatively slow speed, owing to the manner of the gear connections between the directly driven sprocket wheel 108 through the friction disks 65 and 77 and the train of gears that is contained between this inner member and the outer member 50. The relation of the gear is such that the member 50 will be driven in the same direction as if it were directly driven by means of the sprocket wheel without the intervention of the train of gears.

After the vehicle has become sufficiently accelerated and is running at normal speed, the connection from the sprocket gear wheel 108, to the outer member 50 may be made direct by the following means: Pressure is released from the extended end 115, of the bell crank, and the spring 86 forces the bi-conical sleeve 82, over to the right and with the bi-conical sleeve the intermediate member is carried, until the studs 98 disengage the perforations 25, in the disk 24, and the studs 100 engage perforations 99 in the flange 69 of the intermediate member. When this operation has taken place the friction disks 73 and 74 of the outer and inner members respectively, are brought into frictional contact with each other, and through this instrumentality the power is gradually transmitted from the intermediate member 69, to the outer member 50, and by this means direct connection is made, with the sprocket wheel 108, to the outer shell 50, without the intervention of the gearing.

When the parts are in positions shown in Fig. 1, the engine may be run idle, when it will simply turn the inner shell member 56, which is directly connected to the sprocket wheel 108.

It will be observed that all of the operating mechanism, of my variable gear, is well housed and protected from dirt, dust and the like, and that a very simple and single instrumentality is used for changing the gear relation that is to exist between the traction wheel of the vehicle and the engine.

While I have herein described a single embodiment of my invention, I wish it understood that I do not consider my invention to be limited to the exact showing as variations may be made therefrom within the scope of the appended claims, without departing from the spirit of the invention.

What I claim is:

1. In a power transmission gearing for motorcycles, the combination with the axle, supporting frame members for the motorcycle, and a member loosely mounted on the axle, of clutches associated with said loosely mounted member, means at one end of the axle for suitably shifting said clutches, and means at the other end of the axle coöperating with said clutches for rotation of said loosely mounted member.

2. In a device of the character described, a stationary axle affording bearing for a plurality of clutch members, a supporting means to which said axle is attached at its ends, a clutch member for a device to be driven, a clutch member for connection with a driving device, laterally shiftable, intermediate clutch members for effecting transmitting engagement with the other members, means for shifting said intermediate members, and means for rotating said engaged intermediate members and driving clutch member.

3. In a device of the character described, a stationary axle affording bearing for a plurality of clutch members, a supporting means to which said axle is attached at its ends, a clutch member for connection with a device to be driven, means for holding said member in fixed position, a clutch member for connection with an internal combustion engine, a longitudinally shiftable clutch member between said two first mentioned members, a treadle, means for engagement of said treadle with the last mentioned member for rotating said member when the first-mentioned member is held in fixed position, and means of engagement between the shiftable member and the member connected to the gas engine, whereby said engine may be started by application of pressure to said treadle.

4. In a device of the character described, a stationary axle affording bearing for a plurality of clutch members, a supporting means to which said axle is attached at its ends, a member for connection with a device to be driven, a member for connection with an internal combustion engine for driving the first said member, an intermediate member laterally slidable on said axle for engagement with said other members, a train of gears between the said intermediate member and the member to be driven, a rotatable part, means for attachment of said part to the said train of gears upon shifting of the intermediate member, means for rotating the rotatable part, means for fixing the first mentioned member against rotation for rotation of the intermediate member by said rotatable part through said gears, and engagement means between said member for attachment to the engine and the said intermediate member, whereby the former may be rotated by rotation of the rotatable part.

5. In a device of the character described, a stationary axle affording bearing for a plurality of clutch members, a supporting means to which said axle is attached, a clutch member for connection with a device to be driven, a clutch member for connection with a driving device to be started, a laterally shiftable intermediate clutch-carrying part, clutch members thereon for effecting engagement with the other members, a train of gearing between said intermediate part and the member for connection with the device to be driven, and frictional means for connecting the driving member to the driven member through the intermediate member and said train of gears.

6. In a device of the character described, a stationary axle affording bearing for a plurality of clutch members, a supporting means to which said axle is attached, a member for communication with a device to be driven, a member for communication with a driving device, a laterally shiftable intermediate member, means for positively connecting said intermediate member with either of the other members, friction transmitting means between said intermediate member and each of the other members operable when the said intermediate member is moved for dis-engagement of the means for positive connection with the respective member, and means to shift said intermediate member.

7. In a device of the character described, a stationary axle affording bearing for a plurality of clutch members, a supporting means to which said axle is attached, a hollow clutch member for communication with the device to be driven, a coacting hollow clutch member for communication with the driving device coöperating with the first member to provide a housing for an inclosed space, a laterally shiftable intermediate member within the space inclosed by the two first mentioned members, means for effecting transmitting engagement of said shiftable member with either of the other members, two separate sets of friction disks for frictionally connecting said shiftable intermediate member with either of the other members when said intermediate member is shifted in one direction or the other, means for shifting said intermediate member to engage either of the said set of friction disks alternatively, the means between the intermediate member and the driven member including a train of gears whereby said driven member is rotated through one set of the friction disks and said set of gearing at a relatively low speed when the intermediate member is shifted in one direction and is driven at a higher speed directly through the other set of disks when the intermediate member is shifted in the opposite direction.

8. In a device of the character described, a hollow longitudinally-stationary axle affording bearing for a plurality of clutch members, a supporting means, to which said axle is attached, a hollow shell-like member for communication with the device to be driven, a coöperating shell-like member for communication with a driving device, the two members forming a housing for inclosing a space, a laterally shiftable intermediate member for effecting transmitting engagement with the other members, a shiftable support upon which the said intermediate member is rotatably carried, bearing balls interposed between said support and the bearing surfaces of the said intermediate member, means taking through the hollow axle for shifting the said support in one direction and a spring for automatically moving the support in the opposite direction, whereby said intermediate member is caused to engage the driving and driven members.

9. In a device of the character described, a stationary axle, a supporting means to which said axle is attached, a clutch member comprising a shell for communication with the device to be driven, said shell being provided with a relatively wide series of gear teeth on its inner surface, a shell-like clutch member for communication with the driving device forming an inclosed space with the first said clutch member, a laterally shiftable intermediate member in said space, means for effecting transmitting engagement of the intermediate member with either of the other members, the means for the driven member including a train of gears associated with said shiftable member and shiftable therewith for engaging the gear teeth of the inner surface of said driven member, and friction driving means between the said intermediate member and each of the other members, whereby the driven members may be rotated directly by the driving member or indirectly at a lower rate of speed through said set of gears.

10. In a device of the character described, in combination with an axle supporting frame, an axle-supported internally-geared wheel part to be driven, and a driving part; of variable speed gearing for connection, between said driving and driven parts, including an intermediate rotatable part, a gear wheel axially mounted thereon; an intermediate, transmitting, gear wheel in mesh with said axially-disposed gear wheel and in mesh with the internally geared wheel part to be driven, and means to lock said axially mounted gear wheel to said frame.

11. In a device of the character described, a hollow longitudinally-stationary axle affording bearing for a plurality of clutch members, a supporting means, to which said axle is attached, a hollow shell-like member for communication with a device to be driven, a coöperating shell-like member for communication with a driving device, the two members forming a housing for inclosing a space, a laterally shiftable intermediate member for effecting transmitting engagement with the other members, a shiftable bi-conical support upon which the said intermediate member is rotatably carried, bearing balls interposed between said support and the bearing surfaces of the said intermediate member, means taking through the hollow axle for shifting the said cone in one direction and means for moving the cone in the opposite direction, whereby the intermediate member is caused to engage alternatively either the driving or the driven member.

12. In a device of the character described, the combination with an axle, supporting frame members, a member loosely mounted on the axle constituting a part of a driven wheel, and a second member loosely mounted on the axle for connection to a driving engine, of clutches associated with said axle and loosely mounted members, means at one end of the axle for rotation of said member for connection to an engine, and means at the other end of the axle for shifting said clutches for connection of said rotatable members for rotation together.

13. In a device of the character described, the combination with an axle and supporting means therefor, of loosely mounted members thereon, connectible respectively to a wheel to be driven and to a driving engine and forming a hollow space-inclosing hub; speed-varying engaging means, within said hub and alternatively operable means for effecting engagement between said members for initial rotation of the engine member and for rotation of the wheel member by the engine member at different speed.

14. In a device of the character described, the combination with an axle and supporting means therefor, of a loosely mounted member on the axle for connection to a wheel to be driven, another member loosely mounted on the axle, a train of gears between said members including a loosely mounted gear wheel, clutch means to engage said gear wheel to control rotation thereof, and means to connect said second-mentioned loosely mounted member to an engine-driven part, whereby said train of gears effects connection between the first-mentioned movable member and the engine-driven part when the gear wheel is held stationary or between said rotation-controlling clutch means and the engine-driven part when said first-mentioned movable member is stationary.

15. In a device of the character described, the combination with an axle and means for supporting same, of rotatable members on the axle for connection respectively with driven and driving devices, an intermediate member shiftable to either of two positions, two clutch means between said intermediate member and each of the rotatable members each operative in one of said two positions of the intermediate member, one of said clutch means between said intermediate member and a movable member including a rotatable part, means to lock the same against rotation, and means to rotate the same, whereby said clutch means is operable for effecting driving connection from the intermediate member to the appropriate rotatable member and, when said rotatable member is stationary, for driving connection from said rotatable part of the clutch to the other rotatable member for rotation of the driving device to be connected thereto.

16. In a device of the character described, the combination with an axle and means to support the same, of a hub structure for a wheel to be driven comprising two rotatable members mounted on said axle, a shiftable intermediate member, direct clutch means and frictional clutch means between said intermediate member and one of said rotatable members, frictional clutch means and other means of connection between said intermediate member and the other rotatable member, said other means of connection comprising a train of gears, a rotatable part, means to rotate said part, and means to lock said part against rotation.

In testimony whereof I hereunto set my hand in the presence of two witnesses.

FREDERICK W. VODOZ.

In the presence of—
W. LINN ALLEN,
MARY F. ALLEN.